United States Patent
McCormick

(10) Patent No.: US 12,503,950 B2
(45) Date of Patent: Dec. 23, 2025

(54) NON-CONTACT SEAL SHOE WITH DIFFUSER STRUCTURE

(71) Applicant: RTX Corporation, Farmington, CT (US)

(72) Inventor: Duane C. McCormick, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/654,598

(22) Filed: May 3, 2024

(65) Prior Publication Data

US 2025/0341170 A1 Nov. 6, 2025

(51) Int. Cl.
*F01D 11/02* (2006.01)
*F16J 15/44* (2006.01)

(52) U.S. Cl.
CPC ............ *F01D 11/02* (2013.01); *F16J 15/442* (2013.01); *F05D 2240/55* (2013.01)

(58) Field of Classification Search
CPC ...... F05D 2240/55; F16J 15/442; F01D 11/02
See application file for complete search history.

(56) References Cited

U.S. PATENT DOCUMENTS

| | | | |
|---|---|---|---|
| 9,963,991 B2* | 5/2018 | Wilson | F16J 15/442 |
| 10,184,347 B1* | 1/2019 | D'Ambruoso | F16J 15/442 |
| 10,190,431 B2* | 1/2019 | Bidkar | F16J 15/447 |
| 10,358,932 B2* | 7/2019 | Schwarz | F01D 11/025 |
| 10,385,715 B2* | 8/2019 | Wong | F04D 29/053 |
| 10,626,744 B2* | 4/2020 | DiFrancesco | F01D 25/22 |
| 10,731,496 B2* | 8/2020 | DiFrancesco | F16J 15/441 |
| 10,731,761 B2* | 8/2020 | Chuong | F16J 15/442 |
| 10,746,039 B2* | 8/2020 | Chuong | F01D 11/025 |
| 10,815,809 B2* | 10/2020 | DiFrancesco | F01D 11/001 |
| 10,822,983 B2* | 11/2020 | DiFrancesco | F16J 15/4474 |
| 10,830,081 B2* | 11/2020 | Chuong | F16J 15/442 |
| 10,961,858 B2* | 3/2021 | Grover | F01D 11/025 |
| 10,968,763 B2* | 4/2021 | Virkler | F01D 11/025 |
| 10,975,713 B2* | 4/2021 | Grover | F01D 11/003 |
| 10,982,770 B2* | 4/2021 | Grover | F16J 15/441 |
| 10,995,861 B2* | 5/2021 | Hilbert | F01D 11/025 |
| 11,047,481 B2* | 6/2021 | Bidkar | F16J 15/4476 |

(Continued)

OTHER PUBLICATIONS

EP Search Report for EP Patent Application No. 25174101.3 dated Sep. 25, 2025.

*Primary Examiner* — Eugene G Byrd
(74) *Attorney, Agent, or Firm* — Getz Balich LLC

(57) ABSTRACT

An apparatus is provided for rotational equipment which includes a seal device. The seal device includes a plurality of seal shoes, a seal base and a plurality of spring elements. The seal shoes are arranged circumferentially around an axis in an annular array. A first of the seal shoes includes a seal surface and a diffuser surface. The seal surface extends axially along the axis to an axial interface location where the seal surface axially meets the diffuser surface. A minimum radius of the first seal shoe measured from the axis to the seal surface is defined at least at the axial interface location. A diffuser radius measured from the axis to the diffuser surface increases as the diffuser surface extends axially along the axis from the interface location to an axial distal side of the first seal shoe. The spring elements connect the seal shoes and the seal base.

18 Claims, 9 Drawing Sheets

(56) References Cited

U.S. PATENT DOCUMENTS

| | | | | |
|---|---|---|---|---|
| 11,111,805 | B2* | 9/2021 | McCaffrey | F16J 15/442 |
| 11,193,593 | B2* | 12/2021 | Chuong | F16J 15/442 |
| 11,199,102 | B2* | 12/2021 | McCaffrey | F01D 11/001 |
| 11,230,940 | B1* | 1/2022 | McCaffrey | F01D 11/08 |
| 11,359,726 | B2* | 6/2022 | Hilbert | F16J 15/442 |
| 11,378,187 | B2* | 7/2022 | Hilbert | F16J 15/441 |
| 11,391,377 | B2* | 7/2022 | Bangs | F16J 15/40 |
| 11,519,285 | B2 | 12/2022 | Glahn | |
| 12,264,742 | B2* | 4/2025 | Chuong | F16J 15/4478 |
| 2004/0150164 | A1 | 8/2004 | Morgan | |
| 2008/0265513 | A1 | 10/2008 | Justak | |
| 2016/0010480 | A1 | 1/2016 | Bidkar | |
| 2016/0376904 | A1 | 12/2016 | Schwarz | |
| 2017/0211402 | A1* | 7/2017 | Peters | F01D 11/025 |
| 2017/0211406 | A1* | 7/2017 | Peters | F03B 3/12 |
| 2017/0226883 | A1* | 8/2017 | Peters | F01D 5/02 |
| 2017/0248236 | A1* | 8/2017 | Simpson | F16J 15/4472 |
| 2018/0058240 | A1* | 3/2018 | Chuong | F16J 15/445 |
| 2018/0363499 | A1* | 12/2018 | Smoke | F01D 25/246 |
| 2018/0363563 | A1* | 12/2018 | Gunderson | F02C 7/28 |
| 2019/0218926 | A1* | 7/2019 | DiFrancesco | F04D 29/083 |
| 2020/0325825 | A1* | 10/2020 | Chuong | F16J 15/445 |
| 2020/0362714 | A1 | 11/2020 | Hilbert | |
| 2021/0054937 | A1* | 2/2021 | Chuong | F16J 15/442 |
| 2021/0062669 | A1* | 3/2021 | Chuong | F01D 11/003 |
| 2021/0301925 | A1* | 9/2021 | Grover | F01D 11/001 |
| 2022/0065351 | A1* | 3/2022 | Grover | F01D 11/16 |
| 2023/0323953 | A1 | 10/2023 | Chuong | |

* cited by examiner

NON-CONTACT SEAL SHOE WITH DIFFUSER STRUCTURE

BACKGROUND OF THE DISCLOSURE

1. Technical Field

This disclosure relates generally to rotational equipment and, more particularly, to a non-contact seal for rotational equipment.

2. Background Information

A gas turbine engine includes multiple seals for sealing gaps between rotating structures and stationary structures. Various types and configurations of seals are known in the art including non-contact seals. While these known non-contact seals have various benefits, there is still room in the art for improvement.

SUMMARY OF THE DISCLOSURE

According to an aspect of the present disclosure, an apparatus is provided for rotational equipment. This apparatus includes a seal device, and the seal device includes a plurality of seal shoes, a seal base and a plurality of spring elements. The seal shoes are arranged circumferentially around an axis in an annular array. The seal shoes include a first seal shoe that includes a seal surface and a diffuser surface. The seal surface extends axially along the axis to an axial interface location where the seal surface axially meets the diffuser surface. A minimum radius of the first seal shoe measured from the axis to the seal surface is defined at least at the axial interface location. A diffuser radius measured from the axis to the diffuser surface increases as the diffuser surface extends axially along the axis from the interface location to an axial distal side of the first seal shoe. The seal base extends circumferentially around the axis. The spring elements connect and extend between the annular array of the seal shoes and the seal base.

According to another aspect of the present disclosure, another apparatus is provided for rotational equipment. This apparatus includes a seal device, and the seal device includes a plurality of seal shoes, a seal base and a plurality of spring elements. The seal shoes are arranged circumferentially around an axis in an annular array. The seal shoes include a first seal shoe that includes a shoe base, a tooth, a diffuser structure and a groove. The shoe base extends axially along the axis between a first axial distal side of the first seal shoe and a second axial distal side of the first seal shoe. The tooth projects radially out from the shoe base towards the axis to a tooth seal surface. The diffuser structure projects radially out from the shoe base towards the axis to a diffuser surface. The diffuser surface extends axially from a location on a radial inner distal side of the diffuser structure to the second axial distal side of the first seal shoe. The diffuser surface is angularly offset from the axis by an offset angle less than ten degrees. The groove extends axially within the first seal shoe between the tooth and the diffuser structure and the groove is formed by the tooth and the diffuser structure. The seal base circumscribes the annular array of the plurality of seal shoes. The spring elements include a first spring element. The first spring element connects and extends between the first seal shoe and the seal base.

According to still another aspect of the present disclosure, another apparatus is provided for rotational equipment. This apparatus includes a seal device, and the seal device includes a plurality of seal shoes, a seal base and a plurality of spring elements. The seal shoes are arranged circumferentially around an axis in an annular array. The seal shoes include a first seal shoe that includes a seal surface, a diffuser surface and a ramp surface. The seal surface extends axially along the axis from the ramp surface to the diffuser surface. A diffuser radius measured from the axis to the diffuser surface increases as the diffuser surface extends axially along the axis from the seal surface to a second axial distal side of the first seal shoe. The ramp radius measured from the axis to the ramp surface increases as the ramp surface extends axially along the axis from the seal surface to a first axial distal side of the first seal shoe located axially opposite the second axial distal side of the first seal shoe. The seal base circumscribes the annular array of the seal shoes. The spring elements include a first spring element. The first spring element connects and extends between the first seal shoe and the seal base.

The diffuser structure may also project radially out from the shoe base towards the axis to a diffuser seal surface. The diffuser seal surface may be parallel with the tooth seal surface, and/or the diffuser seal surface and the tooth seal surface may be disposed at a common radius from the axis.

The seal surface may be parallel to the axis.

The diffuser surface may follow a straight line trajectory as the diffuser surface extends axially along the axis from the axial interface location to the axial distal side of the first seal shoe.

The diffuser surface may be angularly offset from the axis by an included angle less than ten degrees.

The first seal shoe may also include a side surface at the axial distal side of the first seal shoe. The side surface may be perpendicular to the axis and extend radially inward to a radial interface location where the side surface radially meets the diffuser surface.

An axial length of the diffuser surface may be greater than an axial length of the seal surface.

An axial length of the diffuser surface may be equal to or greater than one-half an axial length of the first seal shoe.

The seal surface and the diffuser surface may each extend circumferentially about the axis between opposing circumferential ends of the first seal shoe.

The first seal shoe may also include a ramp surface. The axial interface location may be a second axial interface location. The seal surface may extend axially along the axis to a first axial interface location where the seal surface axially meets the ramp surface. The axial distal side of the first seal shoe may be a second axial distal side of the first seal shoe. A ramp radius measured from the axis to the ramp surface may increase as the ramp surface extends axially along the axis from the first axial interface location to a first axial distal side of the first seal shoe axially opposite the second axial distal side of the first seal shoe.

The first seal shoe may also include a shoe base, a tooth, a diffuser and a groove. The axial distal side of the first seal shoe may be a second axial distal side of the first seal shoe. The shoe base may extend axially along the axis between a first axial distal side of the first seal shoe and the second axial distal side of the first seal shoe. The tooth may project radially out from the shoe base towards the axis. The diffuser may project radially out from the shoe base, towards the axis, to the seal surface and the diffuser surface. The groove may extend axially between and may be formed by the tooth and the diffuser.

The seal surface may be a diffuser seal surface. The tooth may project radially out from the shoe base, towards the axis, to a tooth seal surface. The diffuser seal surface and the tooth seal surface may be parallel to the axis.

The seal surface may be a diffuser seal surface. The tooth may project radially out from the shoe base, towards the axis, to a tooth seal surface. The tooth seal surface may be spaced the minimum radius from the axis.

The first seal shoe may also include a ramp structure. The seal surface may be a diffuser seal surface. The ramp structure may project radially out from the shoe base, towards the axis, to a ramp seal surface and a ramp surface. The ramp seal surface may extend axially along the axis to the ramp surface. A ramp radius measured from the axis to the ramp surface may increase as the ramp surface extends axially along the axis from the ramp seal surface to the first axial distal side of the first seal shoe.

The ramp seal surface may be disposed radially outboard of the diffuser seal surface.

The spring element may include a first spring element. The first spring element may include an outer mount, an inner mount and a spring beam. The outer mount may be connected to the seal base. The inner mount may be connected to the first seal shoe. The spring beam may extend laterally between and may be connected to the outer mount and the inner mount.

The spring beam may be a first spring beam. The first spring element may also include a second spring beam. The second spring beam may extend laterally between and may be connected to the outer mount and the inner mount.

The apparatus may also include a stationary structure, a rotating structure configured to rotate about the axis, and a seal assembly. The seal assembly may include the seal device. The seal assembly may be configured to seal an annular gap between the rotating structure and the stationary structure.

The first seal shoe may also include one or more vortex generators arranged along the diffuser surface.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
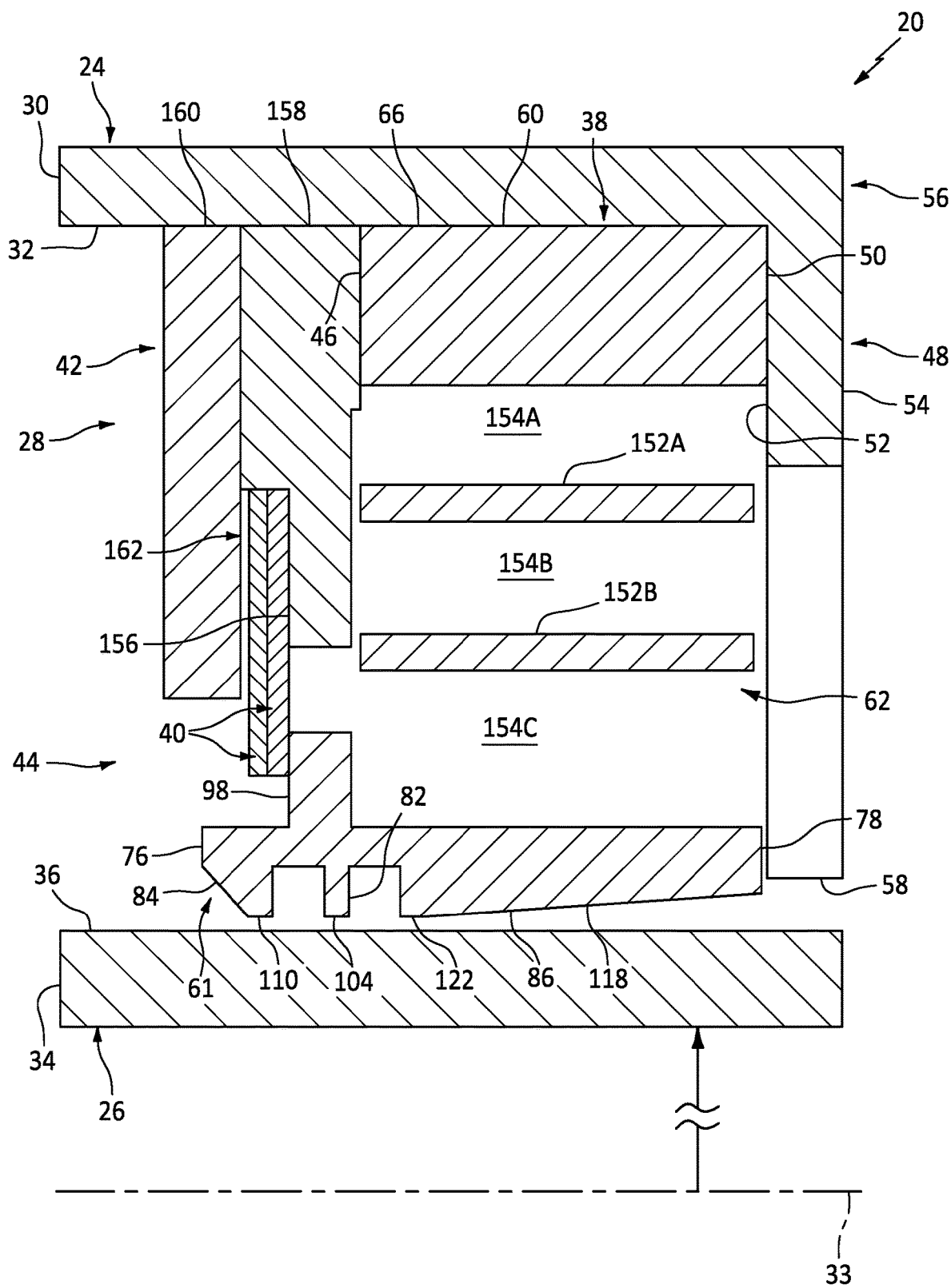
FIG. 1 is a partial side sectional illustration of an assembly for rotational equipment with a ring structure formed integral with a seal carrier.

FIG. 1 illustrates an assembly 20 for rotational equipment such as a powerplant for an aircraft. The aircraft may be an airplane, a helicopter, a drone (e.g., an unmanned aerial vehicle (UAV)) or any other manned or unmanned aerial vehicle or system. The powerplant may be configured as, or otherwise included as part of, a propulsion system for the aircraft. The powerplant, for example, may be a turbofan engine, a turbojet engine, a turboprop engine, a turboshaft engine, or any other type of combustion engine configured to generate thrust and/or drive rotation of a ducted or open propulsor rotor which is configured to generate thrust. The powerplant may alternatively (or also) be configured as, or otherwise included as part of, a power generation system for the aircraft. The powerplant, for example, may be an auxiliary power unit (APU) or any other type of combustion engine configured to mechanically power operation of an electrical generator. The present disclosure, however, is not limited to such exemplary combustion engine powerplants. The rotational equipment assembly 20, for example, may alternatively be included in an electric machine, an industrial gas turbine engine, or any other apparatus in which a seal is provided between a stationary structure and a rotating structure (e.g., a rotor) in both aircraft applications as well as non-aircraft applications.

The rotational equipment assembly 20 of FIG. 1 includes a stationary structure 24, a rotating structure 26 and a seal assembly 28 such as, for example, a non-contact seal assembly. The seal assembly 28 is mounted with the stationary structure 24 and configured to substantially seal an annular gap between the stationary structure 24 and the rotating structure 26 as described below in further detail.

The stationary structure 24 includes a seal carrier 30. This seal carrier 30 may be a discrete, unitary annular body. Alternatively, the seal carrier 30 may be configured with another component/portion of the stationary structure 24. The seal carrier 30 has a seal carrier inner surface 32. This seal carrier inner surface 32 may be substantially cylindrical. The seal carrier inner surface 32 extends circumferentially about (e.g., completely around) and faces towards an axis 33. Briefly, this axis 33 may be a centerline axis of the rotational equipment assembly 20 and/or one or more of its members 24, 26 and/or 28. The axis 33 may also or alternatively be a rotational axis of the rotating structure 26. The seal carrier inner surface 32 of FIG. 1 at least partially forms a bore in the stationary structure 24. This bore is sized to receive the seal assembly 28, which seal assembly 28 may be fixedly attached to the seal carrier 30 by, for example, a press fit connection between the seal assembly 28 and the seal carrier inner surface 32. The seal assembly 28, of course, may also or alternatively be fixedly attached to the seal carrier 30 using one or more other mounting techniques/devices.

The rotating structure 26 includes a rotating seal land 34. This rotating seal land 34 may be a discrete, unitary annular body. For example, the rotating seal land 34 may be mounted to a shaft of the rotating structure 26. Alternatively, the rotating seal land 34 may be configured with another component/portion of the rotating structure 26. For example, the rotating seal land 34 may be an integral part of a shaft of the rotating structure 26, or another component mounted to the shaft.

The rotating seal land 34 of FIG. 1 has a radial outer seal land surface 36. This outer seal land surface 36 may be substantially cylindrical. The outer seal land surface 36 extends circumferentially about (e.g., completely around) and faces away from the axis 33. The outer seal land surface 36 is configured to face towards and may be axially aligned with the seal carrier inner surface 32. While FIG. 1 illustrates the outer seal land surface 36 and the seal carrier inner surface 32 with approximately equal axial lengths along the axis 33, the outer seal land surface 36 may alternatively be longer or shorter than the seal carrier inner surface 32 in other embodiments.

The seal assembly 28 includes a primary seal device 38 and one or more secondary seal devices 40. The seal assembly 28 also includes one or more additional components for positioning, supporting and/or mounting one or more of the seal devices 38 and/or 40 with the stationary structure 24. The seal assembly 28 of FIG. 1, for example, includes a first ring structure 42 (e.g., secondary seal assembly support structure) configured for positioning, supporting and/or mounting the secondary seal devices 40 relative to the primary seal device 38. The one or more secondary seal devices 40 and the first ring structure 42 may collectively provide a secondary seal assembly 44. The first ring structure 42 may also be configured for axially positioning and/or supporting an axial first side 46 of the primary seal device 38 relative to the stationary structure 24.

The seal assembly 28 of FIG. 1 also includes a second ring structure 48 (e.g., primary seal device support structure) configured for axially positioning and/or supporting an axial second side 50 of the primary seal device 38 relative to the stationary structure 24. This second ring structure 48 extends axially along the axis 33 between a first side 52 of the second ring structure 48 and a second side 54 of the second ring structure 48. The second ring structure 48 extends circumferentially about (e.g., completely around) the axis 33.

The second ring structure 48 of FIG. 1 is permanently connected to (e.g., formed integral with, bonded to, etc.) the stationary structure 24 and its seal carrier 30. The second ring structure 48, for example, may be formed with the seal carrier 30 in a single monolithic body 56. Herein, the term "monolithic" may describe a body which is formed as a unitary structure. The second ring structure 48 and the seal carrier 30, for example, may be collectively cast, machined, additively manufactured and/or otherwise formed together to provide the monolithic body 56. By contrast, a non-monolithic body includes a plurality of discretely formed elements which are mechanically fastened and/or otherwise removably attached together following their formation. Referring again to FIG. 1, the second ring structure 48 is configured as an annular and/or castellated shoulder of the stationary structure 24, which projects radially inward from the seal carrier 30 to a distal inner end 58.

Figure 2:
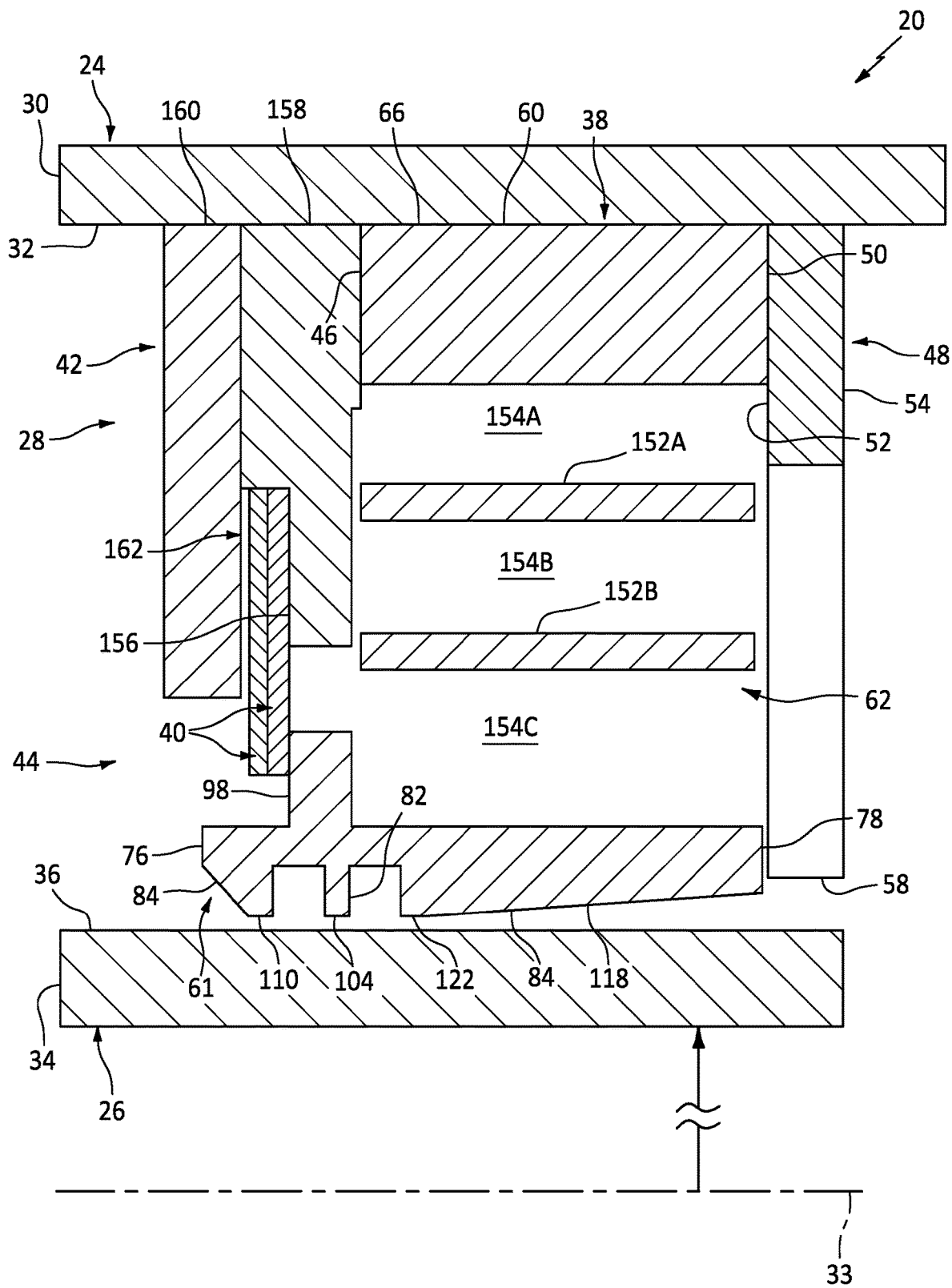
FIG. 2 is a partial side sectional illustration of the rotational equipment assembly with the ring structure discrete from the seal carrier.

Referring to FIG. 2, the second ring structure 48 may alternatively be configured as a discrete element from the stationary structure 24 and its seal carrier 30. The second ring structure 48 of FIG. 2, for example, is fixedly attached to the seal carrier 30 by, for example, a press fit connection between the second ring structure 48 and the seal carrier inner surface 32. The second ring structure 48, of course, may also or alternatively be fixedly attached to the seal carrier 30 using one or more other techniques/devices. Here, the second ring structure 48 is configured as an annular scalloped support ring/plate mated with (e.g., nested with) the seal carrier 30.

Figure 3:
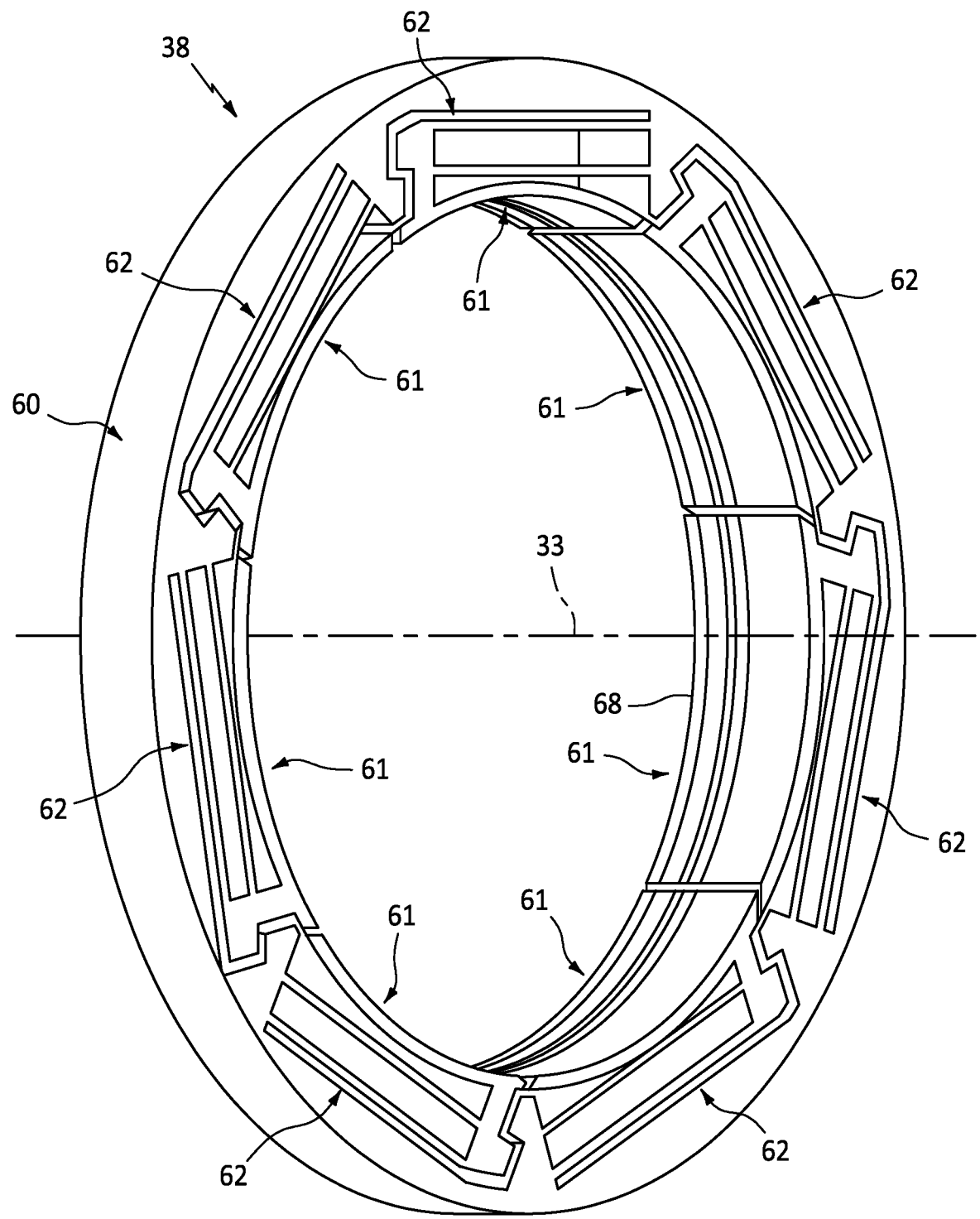
FIG. 3 is a perspective illustration of a primary seal device.

Referring to FIG. 3, the primary seal device 38 is configured as an annular seal device such as, but not limited to, a non-contact hydrodynamic seal device. The primary seal device 38 includes a seal base 60, a plurality of seal shoes 61 and a plurality of spring elements 62 (see also FIGS. 4 and 5).

Figure 4:
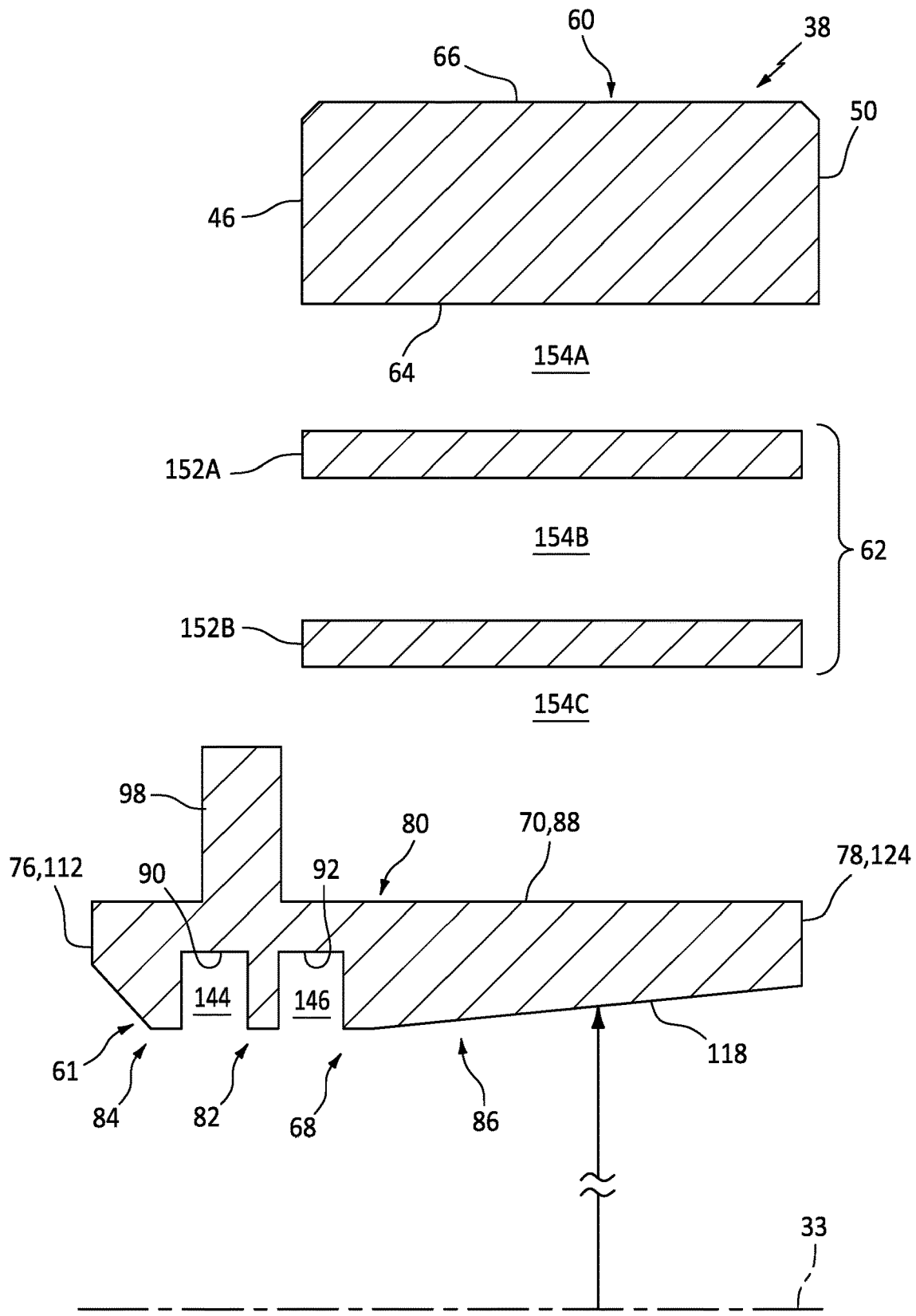
FIG. 4 is a partial side sectional illustration of the primary seal device from a perspective taken along section line 4-4 in FIG. 5.

The seal base 60 may be configured as an annular full hoop body. The seal base 60 of FIG. 3 extends circumferentially about (e.g., completely around) the axis 33. The seal base 60 is configured to extend circumferentially around and thereby circumscribe and support an annular array of the seal shoes 61 as well as an annular array of the spring elements 62. Referring to FIG. 4, the seal base 60 extends axially along the axis 33 between and at least partially or completely forms the first side 46 and the second side 50. The seal base 60 extends radially between a radial inner side 64 of the seal base 60 and a radial outer side 66 of the seal base 60. The seal base outer side 66 of FIG. 1 (see also FIG. 2) radially engages (e.g., is press fit against or otherwise contacts) the stationary structure 24 and its inner surface 32, where the stationary structure 24 and its seal carrier 30 extend circumferentially about (e.g., circumscribe) the seal base 60.

Referring to FIG. 3, the seal shoes 61 may be configured as arcuate bodies and are arranged circumferentially around the axis 33 in the annular array. Each seal shoe 61, for example, is arranged circumferentially between and next to a pair of circumferentially neighboring (e.g., adjacent) seal shoes 61 such that the seal shoes 61 of FIG. 3 are arranged circumferentially end-to-end around the axis 33. The annular array of the seal shoes 61 extends circumferentially about (e.g., completely around) the axis 33, thereby forming an inner bore at a radial inner side 68 of the primary seal device 38. As best seen in FIG. 1, the inner bore is sized to receive the rotating seal land 34, where the rotating structure 26 projects axially through (or into) the inner bore formed by the seal shoes 61.

Figure 5:
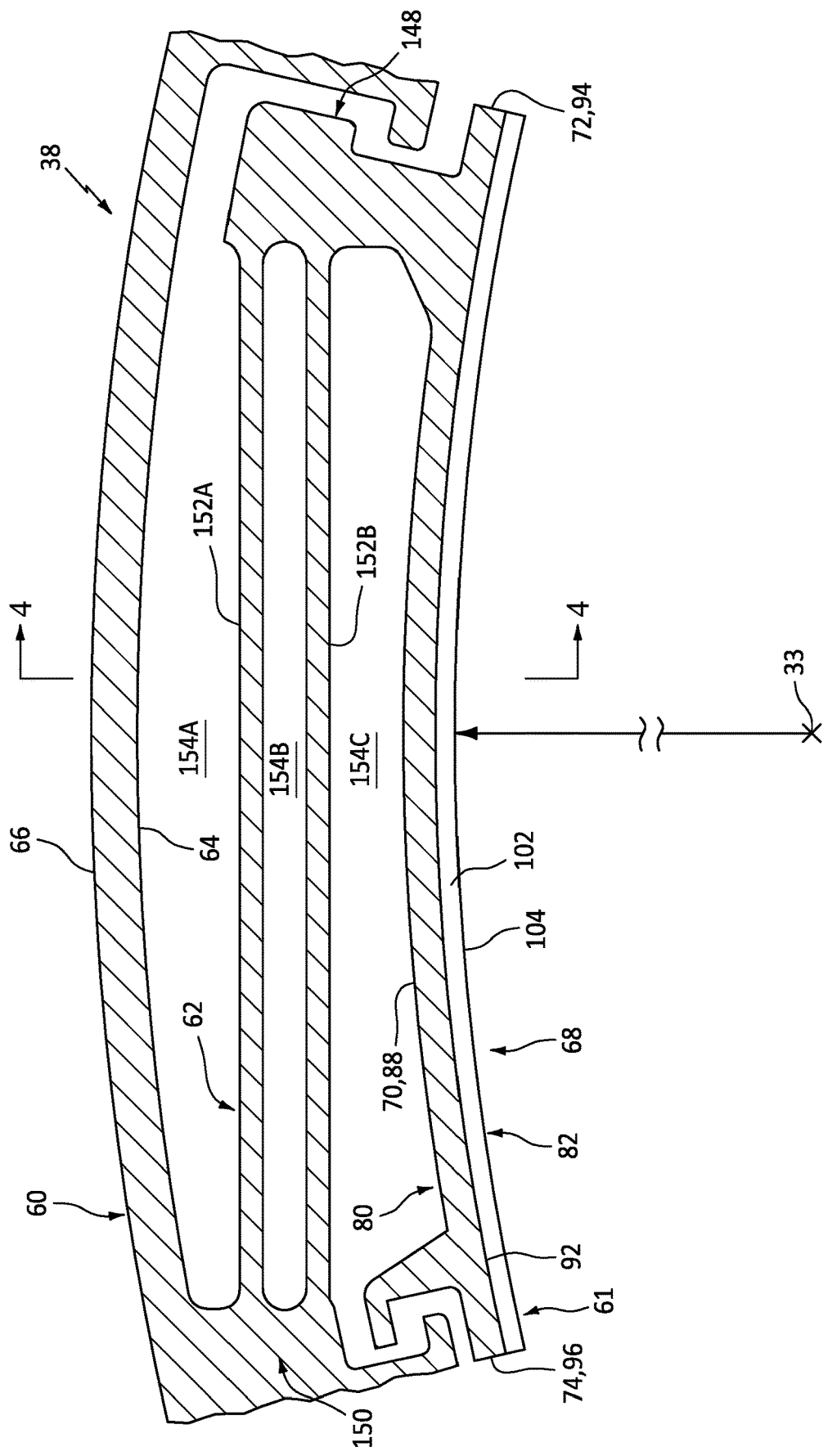
FIG. 5 is a partial cross-sectional illustration of the primary seal device.

Referring to FIG. 5, each of the seal shoes 61 extends radially from the inner side 68 of the primary seal device 38 to a radial outer side 70 of that seal shoe 61. Each of the seal shoes 61 extends circumferentially about the axis 33 between opposing circumferential first and second ends 72 and 74 of that respective seal shoe 61. Referring to FIG. 4, each of the seal shoes 61 extends axially along the axis 33 between an axial first end 76 of the seal shoe 61 and an axial second end 78 of the seal shoe 61. The axial seal shoe first end 76 may be an upstream and/or high pressure end relative, for example, to flow of leakage fluid across the primary seal device 38. The axial seal shoe first end 76 is axially offset/displaced from the axial first side 46. The axial seal shoe second end 78 may be a downstream and/or low pressure end relative, for example, to the flow of leakage fluid across the primary seal device 38. The axial seal shoe second end 78 may be generally axially aligned with the axial second side 50. The seal shoes 61 of the present disclosure, however, are not limited to such exemplary relationships.

Figure 6:
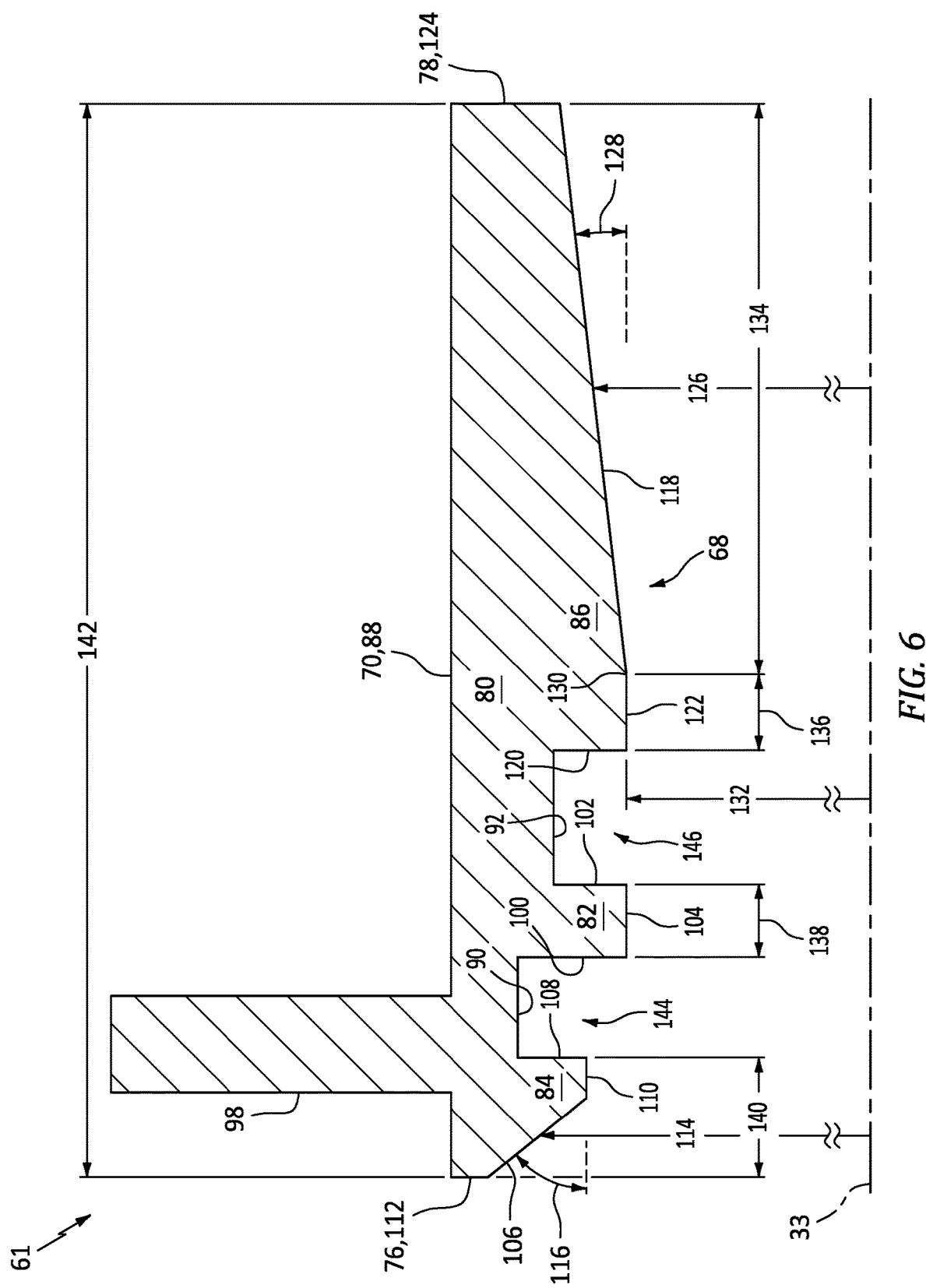
FIG. 6 is a detailed partial side sectional illustration of a seal shoe of the primary seal device.

Referring to FIG. 6, each of the seal shoes 61 includes a seal shoe base 80, a seal shoe tooth 82 (e.g., an arcuate rail or protrusion), a seal shoe ramp structure 84 and a seal shoe diffuser structure 86. Each of these seal shoe members 82, 84, 86 extends circumferentially about the axis 33 between and to the seal shoe first end 72 and the seal shoe second end 74 (see FIG. 5). Each of the seal shoe members 82, 84, 86 may thereby have an arcuate geometry when viewed, for example, a first reference plane perpendicular to the axis 33; e.g., the plane of FIG. 5.

The seal shoe base 80 is disposed at (e.g., on, adjacent or proximate) the seal shoe outer side 70. The seal shoe base 80 of FIG. 5, for example, includes a (e.g., arcuate) base outer surface 88 at the seal shoe outer side 70, one or more (e.g., arcuate) base inner surfaces 90 and 92 (see FIG. 6), a first end surface 94 and a second end surface 96. Referring to FIG. 6, the seal shoe base 80 extends radially inward towards the axis 33 from the base outer surface 88 to the base inner surfaces 90 and 92 and the other seal shoe members 82, 84 and 86. At least a portion (or an entirety) of each base surface 90, 92 in FIG. 6 is arranged parallel with the axis 33 when viewed, for example, in a second reference plane parallel to (e.g., including) the axis 33; e.g., the plane of FIG. 6. Referring to FIG. 5, the first end surface 94 is disposed at the seal shoe first end 72 and the second end surface 96 is disposed at the seal shoe second end 74. Each of the end surfaces 94, 96 may be a flat planar surface. Each of the end surfaces 94, 96, for example, may have a straight line sectional geometry when viewed, for example, in the first reference plane. Referring to FIG. 6, the seal shoe base 80 extends axially from the seal shoe first side 76 to the seal shoe second side 78.

The seal shoe base 80 includes a (e.g., arcuate) side surface 98 generally at the seal shoe first side 76. In the array, side surfaces 98 of the seal shoes 61 collectively form a generally annular, but circumferentially segmented, side surface configured for sealingly engaging with (e.g., contacting) the secondary seal devices 40 as shown in FIG. 1. The seal shoes 61 of the present disclosure, however, are not limited to the foregoing exemplary configuration.

Referring to FIG. 6, the seal shoe tooth 82 is arranged axially along the seal shoe base 80 between, and axially spaced apart from, the ramp structure 84 and the diffuser structure 86. The seal shoe tooth 82 of FIG. 6 includes an axial first side surface 100, an axial second side surface 102 and a radial inner seal surface 104. This seal shoe tooth 82 is connected to (e.g., formed integral with or otherwise attached to) the seal shoe base 80. The seal shoe tooth 82 of FIG. 6, for example, projects radially inwards towards the axis 33 out from the seal shoe base 80 and its base inner surfaces 90 and 92 to the tooth seal surface 104 at a radial inner distal end of the seal shoe tooth 82. The seal shoe tooth 82 extends axially along the seal shoe base 80 between and to the tooth first side surface 100 and the tooth second side surface 102.

The tooth first side surface 100 extends radially between and is contiguous with (e.g., directly meets, adjoins, contacts, etc.) the first base inner surface 90 and the tooth seal surface 104. The tooth second side surface 102 extends radially between and is contiguous with the second base inner surface 92 and the tooth seal surface 104. Each tooth side surface 100, 102 may be arranged perpendicular to the axis 33 and/or the respective base inner surfaces 90 and 92 when viewed, for example, in the second reference plane.

The tooth seal surface 104 extends axially along the axis 33 between and may respectively meet the tooth first side surface 100 and the tooth second side surface 102 at outside corners of the seal shoe tooth 82. At least a portion or an entirety of the tooth seal surface 104 may follow a straight line trajectory as the tooth seal surface 104 extends from the tooth first side surface 100 to the tooth second side surface 102. The tooth seal surface 104 may also be arranged parallel with the axis 33 and, more generally, the outer seal land surface 36 (see FIG. 1) when viewed, for example, in the second reference plane.

The ramp structure 84 is arranged axially along the seal shoe base 80 at the seal shoe first side 76 and is axially spaced from the seal shoe tooth 82. Here, the seal shoe tooth 82 is located axially between the ramp structure 84 and the diffuser structure 86 along the axis 33. The ramp structure 84 of FIG. 6 includes a ramp surface 106, an axial side surface 108 and a radial inner seal surface 110. This ramp structure 84 is connected to (e.g., formed integral with or otherwise attached to) the seal shoe base 80. The ramp structure 84 of FIG. 6, for example, projects radially inward towards the axis 33 out from the seal shoe base 80 and its first base inner surface 90 to the ramp structure ramp surface 106 and the ramp structure seal surface 110. The ramp structure 84 extends axially along the seal shoe base 80 between and to the ramp structure ramp surface 106 and the ramp structure side surface 108.

The ramp structure ramp surface 106 extends axially along the axis 33 between and is contiguous with an axial first side surface 112 of the seal shoe base 80 and the ramp structure seal surface 110. Briefly, the base first side surface 112 is disposed at the seal shoe first side 76 and may be arranged perpendicular to the axis 33 when viewed, for example, in the second reference plane. The ramp structure ramp surface 106 of FIG. 6 has a radius 114 measured from the axis 33 to the ramp structure ramp surface 106. This ramp structure radius 114 may (e.g., continuously and/or uniformly) increase as the ramp structure ramp surface 106 extends axially from (a) an axial intersection with the ramp structure seal surface 110 to (b) a radial intersection with the base first side surface 112. At least a portion or an entirety of the ramp structure ramp surface 106 may follow a straight line trajectory as the ramp structure ramp surface 106 extends from (or about) the base first side surface 112 to (or about) the ramp structure seal surface 110. The ramp structure ramp surface 106 of FIG. 6 is angularly offset from the axis 33 and/or the ramp structure seal surface 110 by an included offset angle 116. This ramp structure offset angle 116 is a non-zero acute angle between, for example, twenty degrees (20°) and eighty degrees (80°); e.g., forty-five degrees (45°). With the foregoing arrangement, the ramp structure 84 radially tapers to the seal shoe base 80 as the ramp structure 84 extends axially away from its ramp structure seal surface 110/towards the seal shoe first side 76. The present disclosure, however, is not limited to such an exemplary embodiment. For example, at least a portion or the entirety of the ramp structure ramp surface 106 may alternatively follow a non-straight-line trajectory (e.g., a curved trajectory) as the ramp structure ramp surface 106 extends from (or about) the base first side surface 112 to (or about) the ramp structure seal surface 110.

The ramp structure side surface 108 extends radially between and is contiguous with the first base inner surface 90 and the ramp structure seal surface 110. The ramp structure side surface 108 may be arranged perpendicular to the axis 33 and/or the first base inner surface 90 when viewed, for example, in the second reference plane.

The ramp structure seal surface 110 extends axially along the axis 33 between and may respectively meet the ramp structure ramp surface 106 and the ramp structure side surface 108. At least a portion or an entirety of the ramp structure seal surface 110 may follow a straight line trajectory as the ramp structure seal surface 110 extends from the ramp structure ramp surface 106 to the ramp structure side surface 108. The ramp structure seal surface 110 may also be arranged parallel with the axis 33 and, more generally, the outer seal land surface 36 (see FIG. 1) when viewed, for example, in the second reference plane. The ramp structure seal surface 110 may also be arranged parallel with the tooth seal surface 104. The ramp structure seal surface 110 of FIG. 6 is recessed from the tooth seal surface 104 in a radial outward direction away from the axis 33. The present disclosure, however, is not limited to such an exemplary embodiment. For example, the ramp structure seal surface 110 and the tooth seal surface 104 may alternatively be radially aligned.

The diffuser structure 86 is arranged axially along the seal shoe base 80 at the seal shoe second side 78 and is axially spaced from the seal shoe tooth 82. The diffuser structure 86 of FIG. 6 includes a diffuser surface 118, an axial side surface 120 and a radial inner seal surface 122. This diffuser structure 86 is connected to (e.g., formed integral with or otherwise attached to) the seal shoe base 80. The diffuser structure 86 of FIG. 6, for example, projects radially inward towards the axis 33 out from the seal shoe base 80 and its second base inner surface 92 to the diffuser structure diffuser surface 118 and the diffuser structure seal surface 122. The diffuser structure 86 extends axially along the seal shoe base 80 between and to the diffuser structure diffuser surface 118 and the diffuser structure side surface 120.

The diffuser structure diffuser surface 118 extends axially along the axis 33 between and is contiguous with an axial second side surface 124 of the seal shoe base 80 and the diffuser structure seal surface 122. Briefly, the base second side surface 124 is disposed at the seal shoe second side 78 and may be arranged perpendicular to the axis 33 when viewed, for example, in the second reference plane. The diffuser structure diffuser surface 118 of FIG. 6 has a radius 126 measured from the axis 33 to the diffuser structure diffuser surface 118. This diffuser structure radius 126 may (e.g., continuously and/or uniformly) increase as the diffuser structure diffuser surface 118 extends axially from (a) an axial intersection with the diffuser structure seal surface 122 to (b) a radial intersection with the base second side surface 124. At least a portion or an entirety of the diffuser structure diffuser surface 118 may follow a straight line trajectory as the diffuser structure diffuser surface 118 extends from (or about) the base second side surface 124 to (or about) the diffuser structure seal surface 122. The diffuser structure diffuser surface 118 of FIG. 6 is angularly offset from the axis 33 and/or the diffuser structure seal surface 122 by an included offset angle 128. This diffuser structure offset angle 128 is a non-zero acute angle equal to or less than, for example, ten degrees (10°); e.g., between two degrees (2°) and six degrees (6°). The present disclosure, however, is not limited to the foregoing exemplary diffuser structure offset angles. More particularly, the diffuser structure offset angle 128 may be chosen such that for a desired running clearance (e.g., ~0.01"), an area ratio between beginning and end of the diffuser section is below, but approaches an incipient separation line on a diffuser design graph so that near maximum pressure recovery is achieved without stalling. With the foregoing arrangement, the diffuser structure 86 radially tapers towards the seal shoe base 80 as the diffuser structure 86 extends axially away from its diffuser structure seal surface 122/towards the seal shoe second side 78. The present disclosure, however, is not limited to such an exemplary embodiment. For example, at least a portion or the entirety of the diffuser structure diffuser surface 118 may alternatively follow a non-straight-line trajectory (e.g., a curved trajectory) as the diffuser structure diffuser surface 118 extends from (or about) the base second side surface 124 to (or about) the diffuser structure seal surface 122.

The diffuser structure side surface 120 extends radially between and is contiguous with the second base inner surface 92 and the diffuser structure seal surface 122. The diffuser structure side surface 120 may be arranged perpendicular to the axis 33 and/or the second base inner surface 92 when viewed, for example, in the second reference plane.

The diffuser structure seal surface 122 extends axially along the axis 33 between and may respectively meet the diffuser structure diffuser surface 118 and the diffuser structure side surface 120. At least a portion or an entirety of the diffuser structure seal surface 122 may follow a straight line trajectory as the diffuser structure seal surface 122 extends from the diffuser structure diffuser surface 118 to the diffuser structure side surface 120. The diffuser structure seal surface 122 may be arranged parallel with the axis 33 and, more generally, the outer seal land surface 36 (see FIG. 1) when viewed, for example, in the second reference plane. The diffuser structure seal surface 122 may also be arranged parallel with the tooth seal surface 104 and/or the ramp structure seal surface 110. The diffuser structure seal surface 122 of FIG. 6 is radially aligned with the tooth seal surface 104. The diffuser structure seal surface 122 and the tooth seal surface 104 may thereby each define a radial innermost extent of the respective seal shoe 61. More particularly, the diffuser structure seal surface 122 (including at an intersection location 130 between the diffuser structure surfaces 118 and 122) and the tooth seal surface 104 may each define a minimum radius 132 (e.g., a smallest radius) of the respective seal shoe 61. This seal shoe minimum radius 132 is measured from the axis 33 to a radial closest location along the respective seal shoe 61; e.g., anywhere along the respective seal surface 104, 122 including the intersection location 130. The present disclosure, however, is not limited to such an exemplary embodiment. For example, the diffuser structure seal surface 122 may alternatively be recessed from the tooth seal surface 104 in the radial outward direction away from the axis 33, or vice versa.

The diffuser structure diffuser surface 118 has an axial length 134 measured axially along the axis 33 from the intersection between the surfaces 118 and 122 to the intersection between the surfaces 118 and 124. The diffuser structure seal surface 122 has an axial length 136 measured axially along the axis 33 from the intersection between the surfaces 118 and 122 to the intersection between the surfaces 120 and 122. The diffuser surface length 134 of FIG. 6 is greater than the seal surface length 136. The diffuser surface length 134 of FIG. 6 is also greater than an axial length 138 of the seal shoe tooth 82 and an axial length 140 of the ramp structure 84. The tooth length 138 is measured axially along the axis 33 from the intersection between the surfaces 102 and 104 to the intersection between the surfaces 100 and 104. The ramp structure length 140 is measured axially along the axis 33 from the intersection between the surfaces 108 and 110 to the intersection between the surfaces 106 and 112. The diffuser surface length 134 of FIG. 6 may be equal to or greater than one-half (½) or three-fifths (⅗) of an axial length 142 of the respective seal shoe 61. The seal shoe length 142 is measured axially along the axis 33 between the opposing axial seal shoe sides 76 and 78.

With the axially spaced seal shoe members 82, 84 and 86 along the seal shoe base 80, the respective seal shoe 61 is configured with one or more seal shoe grooves 144 and 146; e.g., arcuate channels. Each of these seal shoe grooves 144, 146 extends circumferentially about the axis 33 through the respective seal shoe 61. The first seal shoe groove 144 projects radially into the respective seal shoe 61 from the seal surfaces 104 and 110 to the first base inner surface 90. This first seal shoe groove 144 extends axially along the axis 33 within the respective seal shoe 61 between and to the tooth first side surface 100 and the ramp structure side surface 108. The second seal shoe groove 146 projects radially into the respective seal shoe 61 from the seal surfaces 104 and 122 to the second base inner surface 92.

This second seal shoe groove 146 extends axially along the axis 33 within the respective seal shoe 61 between and to the tooth second side surface 102 and the diffuser structure side surface 120.

Referring to FIG. 3, the spring elements 62 are arranged circumferentially about the axis 33 in the annular array. Referring to FIGS. 4 and 5, the spring elements 62 are also arranged (e.g., radially) between the seal shoes 61 and the seal base 60. Each of the spring elements 62 is configured to moveably and resiliently connect a respective one of the seal shoes 61 to the seal base 60.

The spring element 62 of FIG. 5 includes inner and outer mounts 148 and 150 (e.g., inner and outer radial fingers/projections) and one or more spring beams 152A and 152B (generally referred to as "152"). The inner mount 148 may be directly or indirectly connected to (e.g., formed integral with or otherwise attached to) a respective one of the seal shoes 61 and its seal shoe base 80 at the circumferential seal shoe first end 72, where the opposing circumferential seal shoe second end 74 is free floating; e.g., the seal shoe 61 is cantilevered from the inner mount 148. The inner mount 148 projects radially outward from the respective seal shoe 61 and its seal shoe base 80.

The outer mount 150 may be directly or indirectly connected to the seal base 60, and is generally circumferentially aligned with or near the circumferential seal shoe second end 74. The outer mount 150 is therefore disposed a circumferential distance from the inner mount 148. The outer mount 150 projects radially inward from the seal base 60.

The spring beams 152 are configured as resilient, biasing members of the primary seal device 38. The spring beams 152 of FIG. 5, for example, are configured as cantilevered-leaf springs. These spring beams 152 may be radially stacked and spaced apart from one another so as to form a four bar linkage with the inner mount 148 and the outer mount 150. More particularly, each of the spring beams 152 may be directly or indirectly connected to the inner mount 148 and the outer mount 150. Each of the spring beams 152 extends laterally (e.g., circumferentially or tangentially) between and to the inner mount 148 and the outer mount 150. The spring beams 152 of FIG. 5 may thereby laterally overlap a major circumferential portion (e.g., ~65-95%) of the respective seal shoe 61.

During operation of the primary seal device 38 of FIG. 1 (see also FIG. 2), a pressure differential axially across the primary seal device 38 and to a lesser degree rotation of the rotating structure 26 may develop aerodynamic forces and apply a fluid pressure to the seal shoes 61 causing each seal shoe 61 to respectively move radially up and down relative to the outer seal land surface 36. The fluid velocity may increase as a gap between a respective seal shoe 61 and the outer seal land surface 36 increases, thus reducing pressure in the gap and drawing the seal shoe 61 radially inwardly toward the outer seal land surface 36. As the gap closes, the velocity may decrease and the pressure may increase within the gap, thus, forcing the seal shoe 61 radially outward from the outer seal land surface 36. The respective spring element 62 and its spring beams 152 may deflect and move with the seal shoe 61 to facilitate provision of a primary seal of the gap between the outer seal land surface 36 and the seal shoe members 82, 84 and 86 within predetermined design tolerances. By providing each of the seal shoes 61 with its diffuser structure 86 and its diffuser structure diffuser surface 118, seal shoe flutter (e.g., rapid up-and-down movement of a respective seal shoe 61) may be reduced or substantially eliminated by improving the low pressure/suction radially inward in the seal gap. A tolerance of an axial gap between the seal shoes 61 and the second ring structure 48 used to provide mechanical friction to eliminate flutter may thereby be relaxed. Here, an intermittent low pressure axial contact between the seal shoe(s) 61 and the second ring structure 48 may facilitate damping of radial seal shoe movement. In addition, the provision of the diffuser structure 86 and its diffuser structure diffuser surface 118 may also change a pressure distribution along the respective seal shoe 61 to facilitate closer tracking of that seal shoe 61 relative to the rotating structure 26 and its outer seal land surface 36.

While the primary seal device 38 described above is operable to generally seal the annular gap between the stationary structure 24 and the rotating structure 26, the fluid (e.g., gas such as air) may still flow axially through passages 154A-C (generally referred to as "154") defined by radial air gaps between the elements 60 and 152A, 152A and 152B, 152B and 61. The secondary seal assembly 44 and its one or more secondary seal devices 40 therefore are provided to seal off these passages 154 and, thereby, further and more completely seal the annular gap.

Each of the secondary seal devices 40 may be configured as a ring seal element such as, but not limited to, a split ring. Alternatively, one or more of the secondary seal devices 40 may be configured as a full hoop body ring, an annular brush seal or any other suitable ring-type seal.

The secondary seal devices 40 of FIG. 1 are arranged together in an axial stack. In this stack, each of the secondary seal devices 40 axially engages (e.g., contacts) another adjacent one of the secondary seal devices 40. The stack of the secondary seal devices 40 is arranged with the first ring structure 42, which positions and mounts the secondary seal devices 40 with the stationary structure 24 adjacent the primary seal device 38. In this arrangement, the stack of the secondary seal devices 40 is operable to axially engage (e.g., contact) and form a seal between one or more or each of the first side surfaces 98 of the seal shoes 61 and an annular surface 156 of the first ring structure 42. These surfaces 98 and 156 are axially aligned with one another, which enables the stack of the secondary seal devices 40 to slide radially against, but maintain a seal engagement with, one or more or each of the side surfaces 98 and 156 as the seal shoes 61 move radially relative to the outer seal land surface 36 as described above.

The first ring structure 42 may include a secondary seal device support ring 158 and a retention ring 160. The support ring 158 is configured with an annular full hoop body, which extends circumferentially around the axis 33. The support ring 158 includes the annular surface 156, and is disposed axially adjacent and may be axially engaged with (e.g., contacts, abutted against, etc.) the seal base 60 at its first side 46.

The retention ring 160 is configured with an annular full hoop body, which extends circumferentially around the axis 33. The retention ring 160 is disposed axially adjacent and is engaged with (e.g., axially contacts, abutted against) the support ring 158, thereby capturing the stack of the secondary seal devices 40 within an annular channel 162 formed between the rings 158 and 160. The stack of the secondary seal devices 40, of course, may also or alternatively be attached to one of the rings 114, 116 by, for example, a press fit connection and/or otherwise.

In some embodiments, referring to FIG. 6, the diffuser structure 86 may include both the diffuser structure seal surface 122 and the diffuser structure diffuser surface 118 forming its axial extent. In other embodiments, however, the diffuser structure seal surface 122 may be omitted such that the diffuser structure diffuser surface 118 extends axially between and is contiguous with the diffuser structure side surface 120 and the base second side surface 124.

Figure 7:
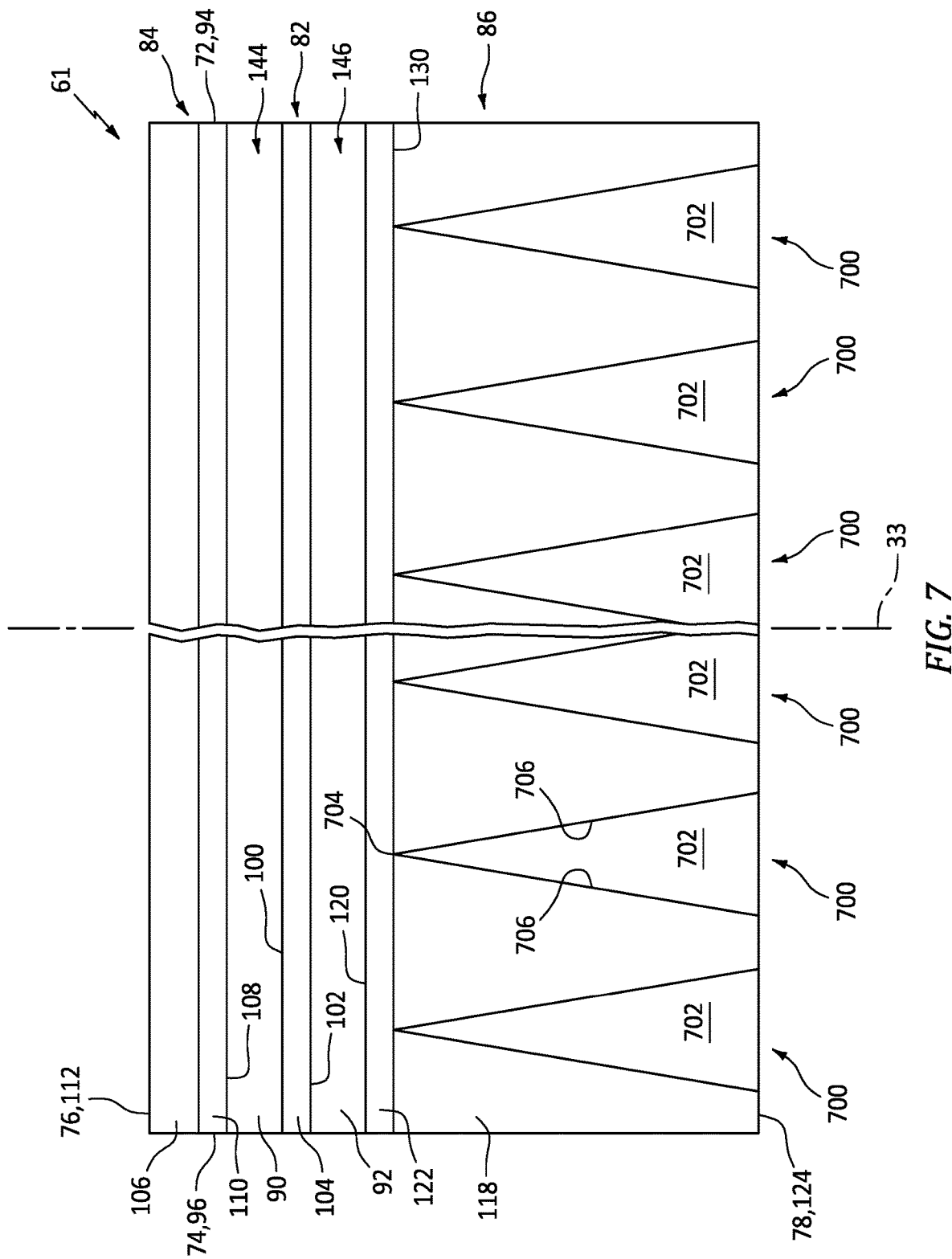
FIG. 7 is a plan view illustration of an inner side of the seal shoe with a plurality of vortex generators.

In some embodiments, the diffuser structure diffuser surface 118 may be a smooth surface. The diffuser structure diffuser surface 118, for example, may be axially and/or circumferentially uninterrupted by apertures and/or protrusions. In other embodiments, referring to FIG. 7, the diffuser structure 86 may be configured with one or more vortex generators 700. These vortex generators 700 may be configured to further recover static pressure along the diffuser structure 86 by converting velocity into a pressure rise instead of turbulence. The vortex generators 700 of FIG. 7 are arranged circumferentially along the diffuser structure 86 and its diffuser surface 118. Each vortex generator 700 of FIG. 7 may have a triangular or wedge shape. Each vortex generator 700 of FIG. 7 is configured as an aperture 702; e.g., a recess. This vortex generator aperture 702 projects radially partially into the diffuser structure 86 from the diffuser structure diffuser surface 118. The vortex generator aperture 702 projects axially into the diffuser structure 86 from the base second side surface 124 to an upstream tip 704 of the respective vortex generator 700. The vortex generator aperture 702 extends laterally within the diffuser structure 86 between opposing sides 706 of the respective vortex generator 700. Here, the vortex generator sides 706 (e.g., continuously) laterally converge as the respective vortex generator 700 and its aperture 702 extend axially from (or about) the base second side surface 124 to (or about) the vortex generator tip 704.

Figure 8:
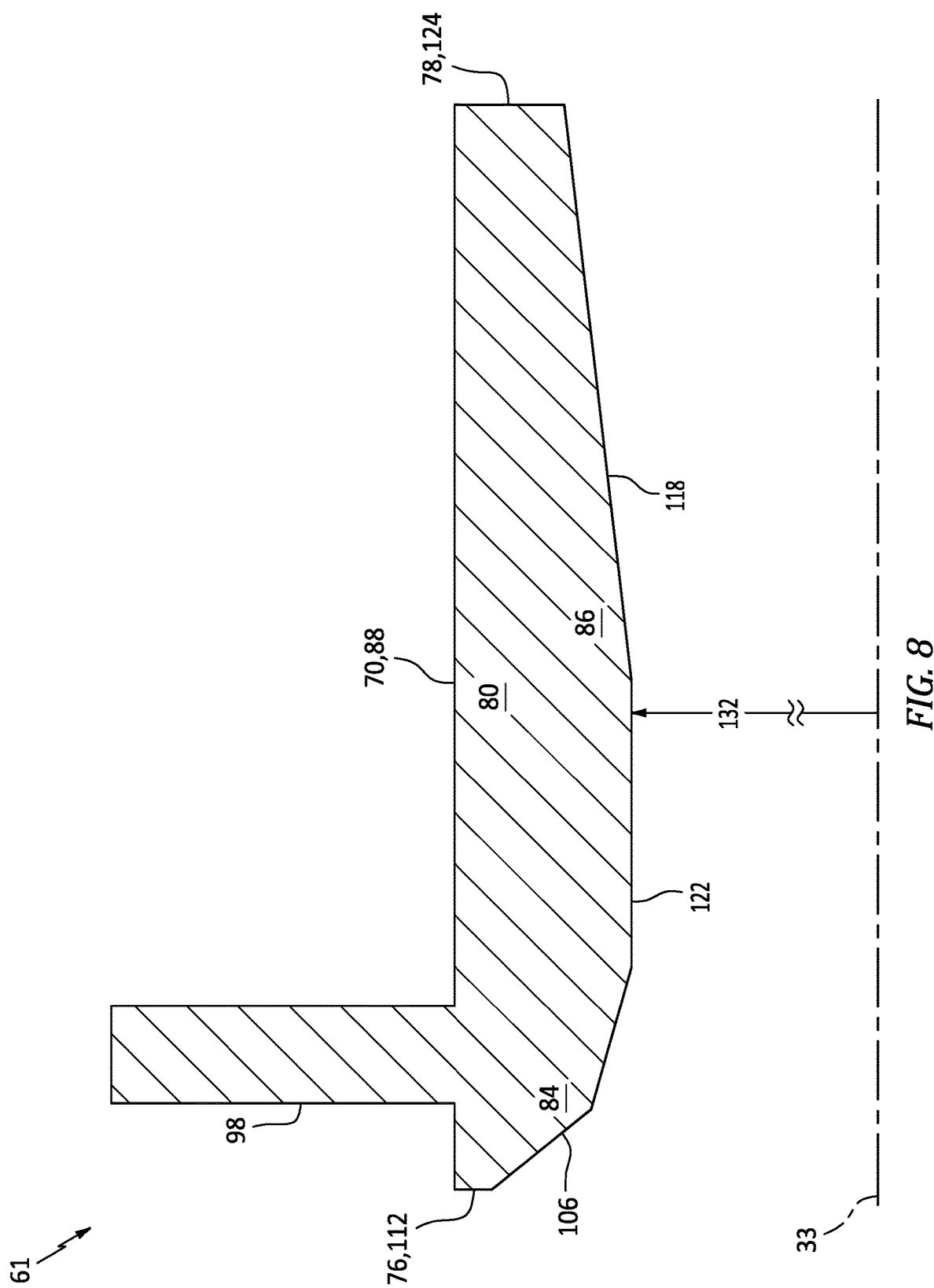
FIG. 8 is a detailed partial side sectional illustration of another seal shoe.

In some embodiments, referring to FIG. 6, each seal shoe 61 may be configured with the single seal shoe tooth 82 axially between the ramp structure 84 and the diffuser structure 86. In other embodiments, however, each seal shoe 61 may be configured with multiple of the seal shoe teeth axially between the ramp structure 84 and the diffuser structure 86. Moreover, it is contemplated the structure 84 may alternatively be configured without the ramp surface 106. The structure 84 may thereby be configured as another one of the teeth. In other embodiments, each seal shoe 61 may be configured without a seal shoe tooth axially between the ramp structure 84 and the diffuser structure 86. In still other embodiments, referring to FIG. 8, the ramp structure 84 and the diffuser structure 86 may be integrated into a single structure. The single seal surface 122 of FIG. 8, for example, extends axially along the axis 33 between and may be contiguous with the ramp surface 106 (e.g., a multi-segment ramp surface) and the diffuser surface 118. With this arrangement, each seal shoe 61 may be configured without any distinct seal shoe teeth and/or seal shoe grooves. Note, to avoid boundary layer separation, a corner/interface between the ramp surface 106 and the diffuser structure seal surface 122 may be rounded or otherwise cased; e.g., without an abrupt angle change.

In some embodiments, as best seen in FIGS. 4-6, the primary seal device 38 and some or all of its elements (e.g., 60-62) may be collectively included in a monolithic body. However, the present disclosure is not limited to such a primary seal device construction.

Figure 9:
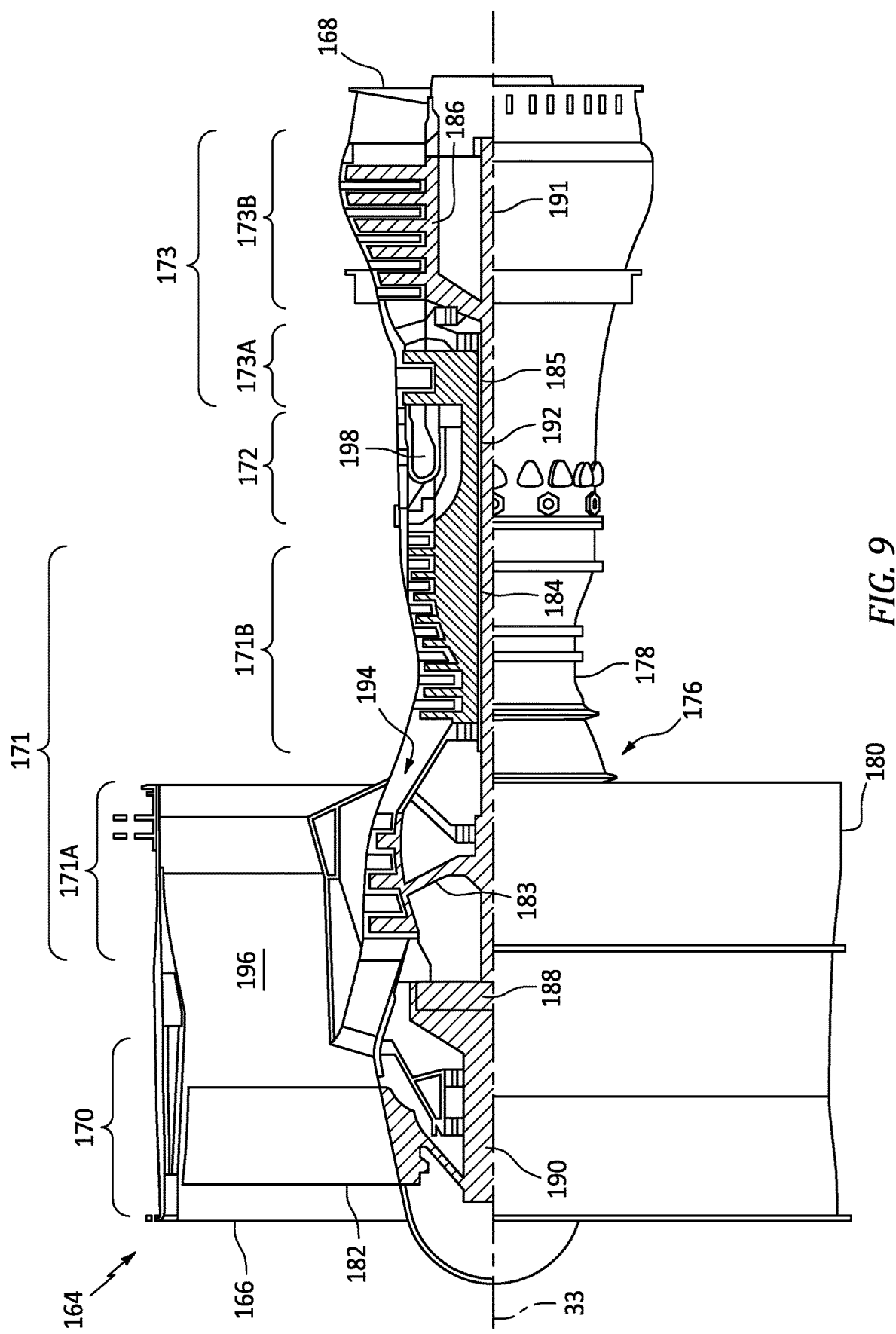
FIG. 9 is a side cutaway illustration of a gas turbine engine with which the rotational equipment assembly may be included.

As described above, the rotational equipment assembly 20 may be configured with various different types and configurations of rotational equipment. FIG. 9 illustrates one such type and configuration of the rotational equipment-a geared turbofan turbine engine 164. This turbine engine 164 includes various stationary structures (e.g., bearing supports, hubs, cases, etc.) as well as various rotors (e.g., rotor disks, shafts, shaft assemblies, etc.) as described below, where the stationary structure 24 and the rotating structure 26 can respectively be configured as any one of the foregoing structures in the turbine engine 164 of FIG. 9, or other structures not mentioned herein.

The turbine engine 164 of FIG. 9 extends axially along the axis 33 between an upstream airflow inlet 166 and a downstream combustion products exhaust 168. The turbine engine 164 includes a fan section 170, a compressor section 171, a combustor section 172 and a turbine section 173. The compressor section 171 includes a low pressure compressor (LPC) section 171A and a high pressure compressor (HPC) section 171B. The turbine section 173 includes a high pressure turbine (HPT) section 173A and a low pressure turbine (LPT) section 173B.

The engine sections 170-173B are arranged sequentially along the axis 33 within a stationary engine housing 176. This engine housing 176 includes an inner structure 178 (e.g., a core case) and an outer structure 180 (e.g., a fan case). The inner structure 178 may house one or more of the engine sections 171A-173B; e.g., a core of the turbine engine 164. The outer structure 180 may house at least the fan section 170.

Each of the engine sections 170, 171A, 171B, 173A and 173B includes a respective bladed rotor 182-186. Each of these bladed rotors 182-186 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The fan rotor 182 is connected to a geartrain 188, for example, through a fan shaft 190. The geartrain 188 and the LPC rotor 183 are connected to and driven by the LPT rotor 186 through a low speed shaft 191. The HPC rotor 184 is connected to and driven by the HPT rotor 185 through a high speed shaft 192. The shafts 190-192 are rotatably supported by a plurality of bearings. Each of these bearings is connected to the engine housing 176 and its inner structure 178 by at least one stationary structure such as, for example, an annular support frame.

During operation, air enters the turbine engine 164 through the airflow inlet 166. This air is directed through the fan section 170 and into a core flowpath 194 and a bypass flowpath 196. The core flowpath 194 extends sequentially through the engine sections 171A-173B. The air within the core flowpath 194 may be referred to as "core air". The bypass flowpath 196 extends through a bypass duct, and the bypass flowpath 196 bypasses (e.g., extends along and outside of) the engine core. The air within the bypass flowpath 196 may be referred to as "bypass air".

The core air is compressed by the LPC rotor 183 and the HPC rotor 184 and is directed into a combustion chamber 198 of a combustor in the combustor section 172. Fuel is injected into the combustion chamber 198 and mixed with the compressed core air to provide a fuel-air mixture. This fuel-air mixture is ignited and combustion products thereof flow through and sequentially drive rotation of the HPT rotor 185 and the LPT rotor 186. The rotation of the HPT rotor 185 and the LPT rotor 186 respectively drive rotation of the HPC rotor 184 and the LPC rotor 183 and, thus, compression of the air received from an inlet into the core flowpath 194. The rotation of the LPT rotor 186 also drives rotation of the fan rotor 182. The rotation of the fan rotor 182 propels the bypass air through and out of the bypass flowpath 196. The propulsion of the bypass air may account for a majority of thrust generated by the turbine engine 164, e.g., more than seventy-five percent (75%) of engine thrust. The turbine engine 164 of the present disclosure, however, is not limited to the foregoing exemplary thrust ratio.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for rotational equipment, comprising:
a seal device including a plurality of seal shoes, a seal base and a plurality of spring elements;
the plurality of seal shoes arranged circumferentially around an axis in an annular array, the plurality of seal shoes comprising a first seal shoe that includes a seal surface and a diffuser surface, and the seal surface extending axially along the axis to an axial interface location where the seal surface axially meets the diffuser surface, wherein a minimum radius of the first seal shoe measured from the axis to the seal surface is defined at least at the axial interface location, and a diffuser radius measured from the axis to the diffuser surface increases as the diffuser surface extends axially along the axis from the interface location to an axial distal side of the first seal shoe;
the seal base extending circumferentially around the axis;
the plurality of spring elements connecting and extending between the annular array of the plurality of seal shoes and the seal base; and
the first seal shoe further including one or more vortex generators arranged along the diffuser surface.

2. The apparatus of claim 1, wherein the seal surface is parallel to the axis.

3. The apparatus of claim 1, wherein the diffuser surface follows a straight line trajectory as the diffuser surface extends axially along the axis from the axial interface location to the axial distal side of the first seal shoe.

4. The apparatus of claim 1, wherein the diffuser surface is angularly offset from the axis by an included angle less than ten degrees.

5. The apparatus of claim 1, wherein
the first seal shoe further includes a side surface at the axial distal side of the first seal shoe; and
the side surface is perpendicular to the axis and extends radially inward to a radial interface location where the side surface radially meets the diffuser surface.

6. The apparatus of claim 1, wherein an axial length of the diffuser surface is greater than an axial length of the seal surface.

7. The apparatus of claim 1, wherein an axial length of the diffuser surface is equal to or greater than one-half an axial length of the first seal shoe.

8. The apparatus of claim 1, wherein the seal surface and the diffuser surface each extend circumferentially about the axis between opposing circumferential ends of the first seal shoe.

9. The apparatus of claim 1, wherein
the first seal shoe further includes a ramp surface;
the axial interface location is a second axial interface location, and the seal surface extends axially along the axis to a first axial interface location where the seal surface axially meets the ramp surface; and
the axial distal side of the first seal shoe is a second axial distal side of the first seal shoe, and a ramp radius measured from the axis to the ramp surface increases as the ramp surface extends axially along the axis from the first axial interface location to a first axial distal side of the first seal shoe axially opposite the second axial distal side of the first seal shoe.

10. An apparatus for rotational equipment, comprising:
a seal device including a plurality of seal shoes, a seal base and a plurality of spring elements;
the plurality of seal shoes arranged circumferentially around an axis in an annular array, the plurality of seal shoes comprising a first seal shoe that includes a seal surface and a diffuser surface, and the seal surface extending axially along the axis to an axial interface location where the seal surface axially meets the diffuser surface, wherein a minimum radius of the first seal shoe measured from the axis to the seal surface is defined at least at the axial interface location, and a diffuser radius measured from the axis to the diffuser surface increases as the diffuser surface extends axially along the axis from the interface location to an axial distal side of the first seal shoe;
the seal base extending circumferentially around the axis; and
the plurality of spring elements connecting and extending between the annular array of the plurality of seal shoes and the seal base;
wherein the first seal shoe further includes a shoe base, a tooth, a diffuser and a groove;
wherein the axial distal side of the first seal shoe is a second axial distal side of the first seal shoe, and the shoe base extends axially along the axis between a first axial distal side of the first seal shoe and the second axial distal side of the first seal shoe;
wherein the tooth projects radially out from the shoe base towards the axis;
wherein the diffuser projects radially out from the shoe base, towards the axis, to the seal surface and the diffuser surface; and
wherein the groove extends axially between and is formed by the tooth and the diffuser.

11. The apparatus of claim 10, wherein
the seal surface is a diffuser seal surface, and the tooth projects radially out from the shoe base, towards the axis, to a tooth seal surface; and
the diffuser seal surface and the tooth seal surface are parallel to the axis.

12. The apparatus of claim 10, wherein
the seal surface is a diffuser seal surface, and the tooth projects radially out from the shoe base, towards the axis, to a tooth seal surface; and
the tooth seal surface is spaced the minimum radius from the axis.

13. The apparatus of claim 10, wherein
the first seal shoe further includes a ramp structure;
the seal surface is a diffuser seal surface, and the ramp structure projects radially out from the shoe base, towards the axis, to a ramp seal surface and a ramp surface;
the ramp seal surface extends axially along the axis to the ramp surface; and a ramp radius measured from the axis to the ramp surface increases as the ramp surface extends axially along the axis from the ramp seal surface to the first axial distal side of the first seal shoe.

14. The apparatus of claim 13, wherein the ramp seal surface is disposed radially outboard of the diffuser seal surface.

15. The apparatus of claim 1, wherein
the plurality of spring element comprise a first spring element;
the first spring element includes an outer mount, an inner mount and a spring beam;
the outer mount is connected to the seal base;
the inner mount is connected to the first seal shoe; and
the spring beam extends laterally between and is connected to the outer mount and the inner mount.

16. The apparatus of claim 15, wherein
the spring beam is a first spring beam, and the first spring element further includes a second spring beam; and
the second spring beam extends laterally between and is connected to the outer mount and the inner mount.

17. The apparatus of claim 1, further comprising:
a stationary structure;
a rotating structure configured to rotate about the axis; and
a seal assembly including the seal device, the seal assembly configured to seal an annular gap between the rotating structure and the stationary structure.

18. An apparatus for rotational equipment, comprising:
a seal device including a plurality of seal shoes, a seal base and a plurality of spring elements;
the plurality of seal shoes arranged circumferentially around an axis in an annular array, the plurality of seal shoes comprising a first seal shoe that includes a shoe base, a tooth, a diffuser structure and a groove, the shoe base extending axially along the axis between a first axial distal side of the first seal shoe and a second axial distal side of the first seal shoe, the tooth projecting radially out from the shoe base towards the axis to a tooth seal surface, the diffuser structure projecting radially out from the shoe base towards the axis to a diffuser surface, the diffuser surface extending axially from a location on a radial inner distal side of the diffuser structure to the second axial distal side of the first seal shoe, the diffuser surface angularly offset from the axis by an offset angle less than ten degrees, and the groove extending axially within the first seal shoe between and formed by the tooth and the diffuser structure;
the seal base circumscribing the annular array of the plurality of seal shoes; and
the plurality of spring elements comprising a first spring element, and the first spring element connecting and extending between the first seal shoe and the seal base.

* * * * *